July 11, 1950  E. A. PIERRE  2,514,965
METALLIC MINE STANCHION
Filed Feb. 25, 1947  3 Sheets-Sheet 1

Inventor:
Emile Alfred Pierre

July 11, 1950  E. A. PIERRE  2,514,965
METALLIC MINE STANCHION
Filed Feb. 25, 1947  3 Sheets-Sheet 2

July 11, 1950  E. A. PIERRE  2,514,965
METALLIC MINE STANCHION
Filed Feb. 25, 1947  3 Sheets-Sheet 3

INVENTOR.
EMILE ALFRED PIERRE
BY

Patented July 11, 1950

2,514,965

UNITED STATES PATENT OFFICE 2,514,965

METALLIC MINE STANCHION

Emile Alfred Pierre, Valenciennes, France, assignor to "L'Etancon Compense" (Societe a Responsabilite limitee), Paris, France, a corporation of France Application February 25, 1947, Serial No. 730,870
In France January 16, 1946

Section 1, Public Law 690, August 8, 1946
Patent expires January 16, 1966

8 Claims. (Cl. 248—354)

My invention relates to metallic mine stanchions comprising an upper stanchion element slidably mounted in a lower stanchion element and locked inside the latter by means of a cam pivoting under the effect of the supported load around a fixed axis at right angles to the direction common to both elements and exerting a transverse pressure against the movable element.

In such stanchions wherein the lower stationary element is provided on one of its faces with a longitudinal opening making possible sliding movement of a clamping shoe exerting pressure on the corresponding face of the sliding element, the mentioned stationary element is integral with a double stirrup extending to both sides of said opening and having both parallel ends thereof forming bearings with an axis at right angles to the direction common to both elements and in which bearings the hubs of the cam are journaled, the latter engaging the clamping shoe with its opposed face.

The stanchions hitherto known and so formed display the drawback that due to the considerable pressures which occur, cause jamming of the elements which are in contact and which renders the release of the stanchion practically impossible.

The main object of my invention is to have a stanchion free from said drawback and permitting both a ready clamping and a ready release.

According to one feature of my invention, the cam used therein is smaller than the previously used conventional cams and comprises on its face opposed to the axis of rotation a longitudinal notch having a slanting bottom with the plane of symmetry thereof extending through the axis of rotation, said notch being adapted to receive through a sliding movement, an assembling wedge by which it is made fast with the clamping shoe.

This arrangement makes it possible, on the one hand and before application of the load to be supported, to obtain the initial clamping of the stanchion and, on the other hand, to obtain a ready release of the stanchion by providing the connection wedge and, correspondingly, the bottom of the cam notch an angle approaching 22°.

According to another feature of my invention the upper and lower faces of the cam limiting the notch laterally are provided with two transverse openings adapted to receive a key, while the connection wedge has a corresponding opening also intended to be traversed by said key which holds fast the connection wedge as soon as the initial clamping has been effected.

However, it has been found that the driving in of an assembling wedge having an angle of about 22° is a difficult operation.

Another object of my invention is to remedy this further drawback.

According to another feature of my invention, between the bearing surfaces of the shoe which transmits the pressure resulting from the load and the bottom of the notch provided in the cam, a first assembling wedge having an angle which is sufficiently small, practically near 12° to facilitate easy insertion, is simultaneously inserted with a complementary wedge engaging by means of one of its faces the corresponding face of the first wedge and by means of the other face the bottom of the notch, said second wedge having an angle complementary to that of the first wedge so that the whole makes an angle approaching 22°. Said complementary wedge is provided with a transverse opening capable of being located between two openings provided as previously mentioned in both cheeks of the cam limiting the notch laterally so as to permit the insertion of a key locking the complementary wedge.

According to a preferred form of my invention, the key which is rectangular in cross-section has the form of a wedge, the section of the opening provided in the complementary wedge being such that the key becomes located therein while presenting its tip downwards.

Owing to said arrangement when the complementary wedge is locked through the key it is then very easy because of its small apex angle to cause the assembling wedge to be driven in so as to provide the initial clamping; said wedge is firmly jammed as soon as the load is applied. The release is very easily effected by drawing out the key which locks the complementary wedge and by striking on the assembling wedge; both wedges then acting as a single wedge having an angle approaching 22° and hence are shifted back simultaneously.

My invention will be better understood by means of the appended drawings in which several preferred forms are shown by way of examples and in which.

Figures 6, 7:
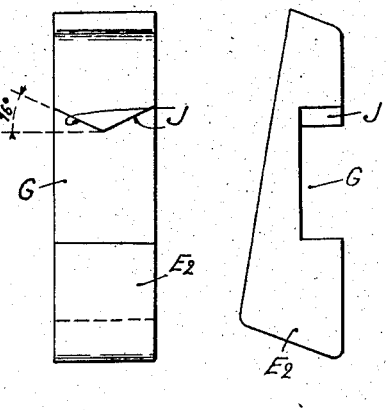
Figure 6 is an elevational view showing a complementary wedge.
Figure 5:
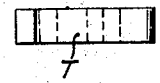
Figure 5 is a top plan view of the same.
Figure 8:
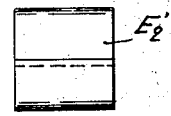
Figure 9:
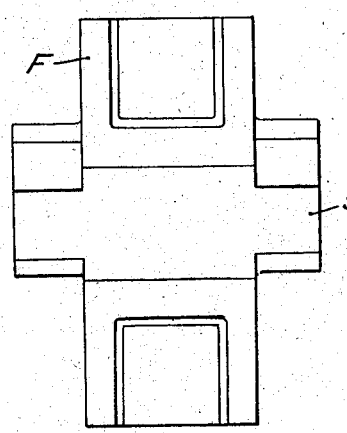
Figure 10:
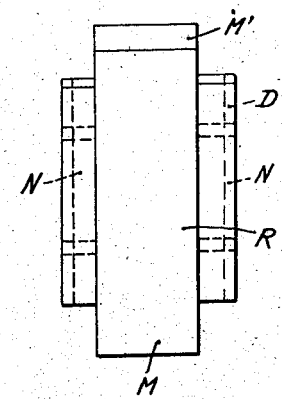
Figure 11:
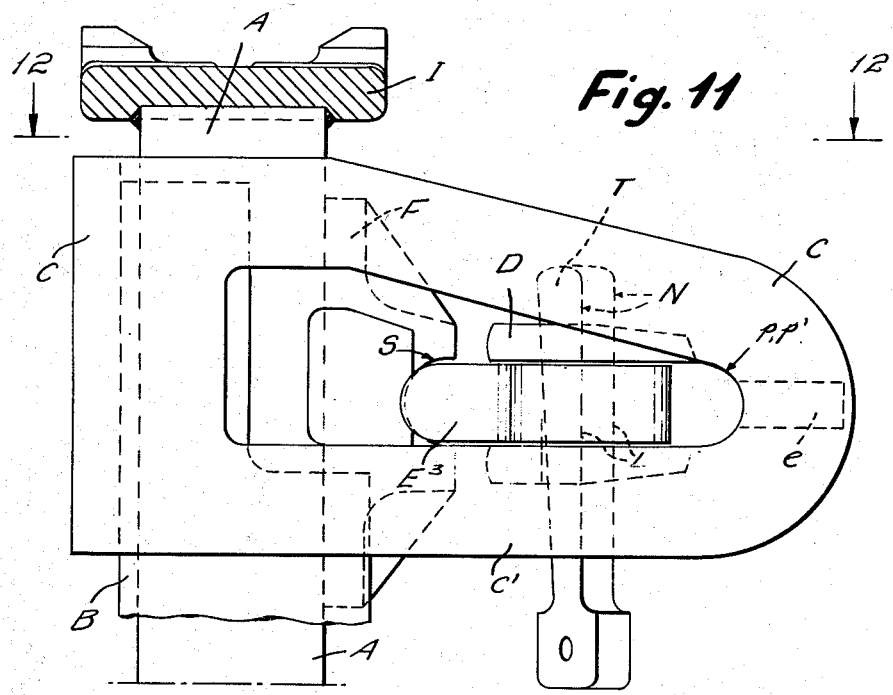
Figure 12:
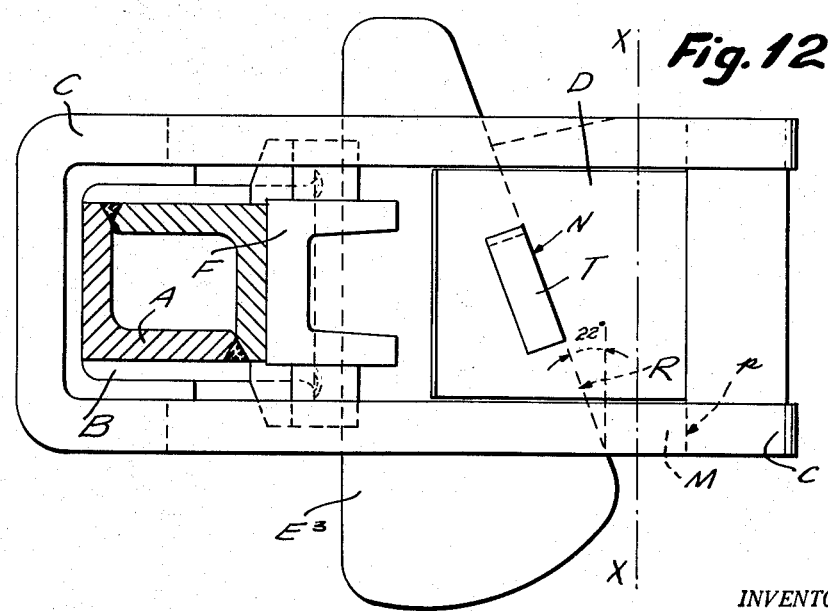

Figure 7 is a side view of the same.
Figure 8 is a top plan view of the same.
Figure 9 is an end view of a clamping shoe.
Figure 10 is an end view of a cam.
Figure 11 is an elevational view of a modified clamping device according to my invention similar to the one shown in Figures 1 to 10; and
Figure 12 is a sectional view of the clamping device shown in Figure 11 along line 12—12 of Figure 11.

Figure 1:
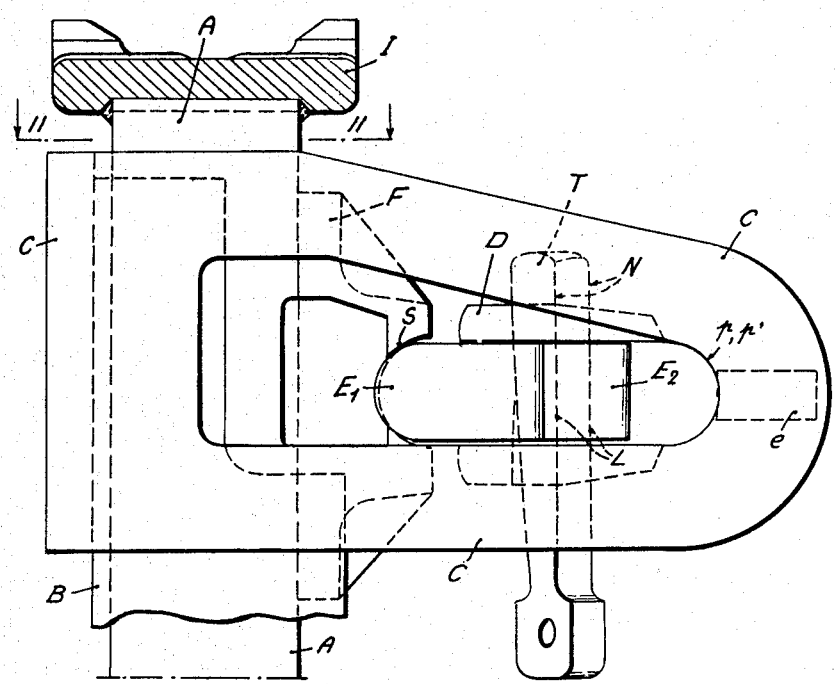
Figure 1 is an elevational view showing the clamping device of a metallic mine stanchion according to the invention.
Figure 2:
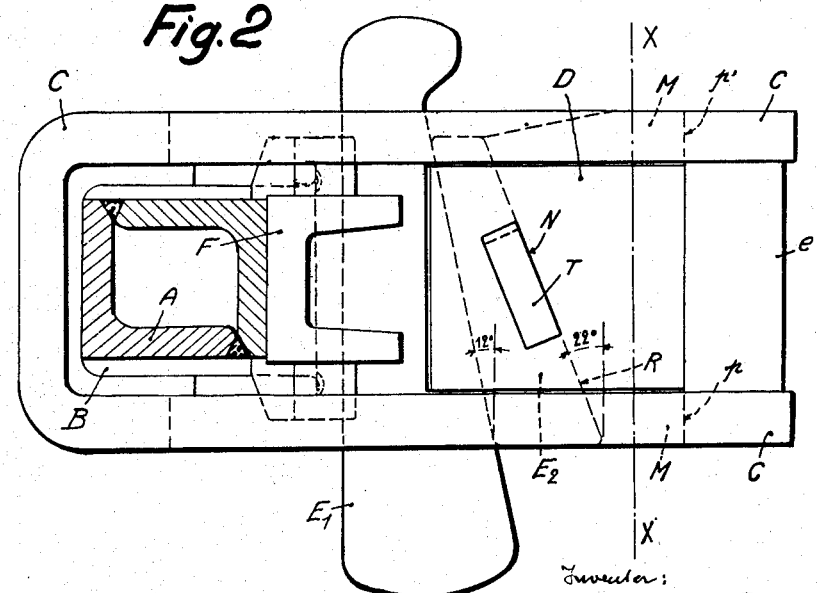
Figure 2 is a sectional view of the same through line II—II of Figure 1.
Figure 3:
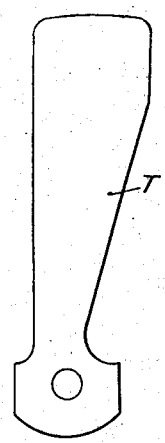
Figure 3 is an elevational view showing a key adapted for locking the complementary wedge.
Figure 4:
Figure 4 is a side view thereof.

In Figures 1 and 2, A is the upper stanchion element slidably mounted inside the stationary tubular element or stanchion foot B. The stanchion head is provided with bosses I adapted to receive hammer strokes for putting the stanchion in position.

The stanchion foot B, which is notched in its upper part, i. e. is provided with an opening so as to clear the right hand face of the element A completely carries a double stirrup C which is secured for instance by welding and both ends of which are joined by a cross-tie e. The outermost rounded part of each stirrup determines a half cylindrical bearing surface p, p' with the theoretical axis X X (Figure 2) at right angles to the direction common to both stanchion elements and in which a cam D is journalled with its hubs M, M'.

The cam has the plane of symmetry thereof extending through the axis X X and has a notch R with a slanting bottom which presents to the axis X X an angle which is preferably equal to 22°. Furthermore, said cam has two symmetrical rectangular openings N which are flush with the bottom of the notch R.

I provide also in addition to the double stirrup C—called also "lock"—a clamping shoe F arranged so as to pass through the opening in the stanchion foot T, and to abut with its rear face against the upper stanchion element A slidably mounted inside the foot.

This shoe F is provided on its outwardly facing surface with two bearing faces S, adapted to cooperate with the clamping device as will be explained farther below in detail.

The clamping device comprises an assembling wedge $E_1$ having preferably an angle approaching 12° and a complementary wedge $E_2$ (Figures 6 to 8) having preferably an angle also approaching 12° so that the whole of the device forms an angle approaching 22°. On the face of the wedge $E_2$ which is adapted to engage the bottom of the notch R of the cam a notch G is provided with one edge thereof limited through two faces J perpendicular to the bottom of the notch and disposed at an angle approaching 16° with a plane perpendicular to the plane of symmetry.

The clamping device is completed by a key T (Figures 3 to 5) having the form of a wedge with an angle approaching 16° and adapted to be disposed with the tip directed downwards in the openings N and G so as to lock the complementary wedge $E_2$.

For wedging the stanchion the key T is put in place which locks the wedge $E_2$, and the wedge $E_1$ is then driven in with the hammer which is an easy operation owing to the narrow angle of 12° formed by the latter. Then the force of compression intervenes through the play of the shoe end of the pivoting unit. At this moment the wedge $E_1$ is clamped with a pressure sufficient to prevent further movement of the wedge. The complementary wedge $E_2$ serves to permit the release of the device. The key is released very easily, whereafter the operator strikes on the wedge $E_1$ with the hammer; and then the whole unit $E_1$, $E_2$ which forms a wedge of 22° may be shifted back to initial position without any difficulty.

In Figures 11 and 12 I have shown a clamping device similar to the one shown in Figures 1 to 10 and described above; the only difference between these two devices is that in the modified clamping device I do not employ two wedges, namely, an assembling wedge and a complementary wedge, but only one wedge, namely an assembling wedge $E_3$ having the shape of the assembling and complementary wedges combined. In all other respects, this modified embodiment is identical with the one described above. I wish to note that the term "wedge arrangement" as used in the following claims is intended to define either one single assembly wedge or the two wedges, namely, the assembling wedge and the complementary wedge in combination with each other.

Having now fully described my invention, I claim:

1. A metallic mine stanchion which comprises, in combination, a tubular stanchion foot provided with an opening in its upper part opposite one of its faces, an upper stanchion element slidably mounted inside the foot, a lock with the upper part of the foot and determining bearing faces with an axis orthogonal to the axis of the stanchion, a cam rockingly mounted in the bearing faces of the lock and comprising on its face opposed to the axis of rotation a longitudinal notch with a slanting bottom the plane of symmetry of which passes through the axis of rotation, an assembling wedge engaging the bottom of said cam with one of its faces and a clamping shoe inserted in the opening in the foot engaging the second face of the wedge so as to exert a transversal pressure on the sliding element under the action of the load.

2. A metallic mine stanchion which comprises, in combination, a tubular stanchion foot provided with an opening in its upper part opposite one of its faces, an upper stanchion element slidably mounted inside said foot, a lock with the upper part of the foot and determining bearing surfaces with an axis orthogonal to the axis of the stanchion, a cam rockingly mounted in the bearing surfaces of the lock and comprising, on its face opposed to the axis of rotation, a longitudinal notch the plane of symmetry of which passes through the axis of rotation and the bottom of which makes an angle near 22° with the latter, an assembling wedge having an angle equal to the preceding one, inserted into said notch and engaging the bottom of the latter with one of its faces and a clamping shoe inserted into the opening of the foot and engaging the second face of the wedge so as to insure a transversal pressure on the sliding element under the action of the charge.

3. A metallic mine stanchion which comprises, in combination, a tubular stanchion foot provided in its upper part with an opening opposite one of its faces, an upper stanchion element slidably mounted inside the foot, a lock with the upper part of the foot and determining bearing surfaces with an axis orthogonal to the axis of the stanchion, a cam rockingly mounted in the bearing surfaces of the lock comprising on its face opposed to the axis of rotation a longitudinal notch with a slanting bottom the plane of symmetry of which passes through the axis of rotation and the side faces of which are provided with two superposed transversal openings, an assembling wedge engaging the bottom of said notch with one of its faces and comprising a transversal opening capable of coming to lie opposite the openings provided in the bottom of the notch, a key having a cross section corresponding to that of the opening provided in the assembling wedge and a clamping shoe inserted into the opening of the foot and engaging the second face of the assembling wedge so as to exert a transversal pressure on the sliding element under the action of the charge.

4. A metallic mine stanchion which comprises, in combination, a tubular stanchion foot provided in its upper part with an opening opposite one of its faces, an upper stanchion element slidably mounted inside the foot, a lock with the upper part of the foot and determining bearing surfaces with an axis orthogonal to the axis of the stanchion, a cam slidably mounted in the bearing surfaces of the lock comprising in its face opposite to the axis of rotation a longitudinal notch the plane of symmetry of which passes through the axis of rotation and the bottom of which makes an angle near 22° with the latter and the side faces of which are provided with two superposed transversal openings, an assembling wedge having an angle equal to the preceding one inserted into the said notch and engaging the bottom of the latter with one of its faces and comprising a transversal opening capable of coming to lie opposite the said openings, a key having a cross section corresponding to that of the opening provided in the assembling wedge and a clamping shoe inserted into the opening of the foot and engaging the second face of the assembling wedge so as to insure a transversal pressure on the sliding element under the action of the charge.

5. A metallic mine stanchion which comprises, in combination, a tubular stanchion foot provided in its upper part with an opening opposite one of its faces, an upper stanchion element slidably mounted inside the foot, a lock with the upper part of the foot and determining bearing surfaces with an axis orthogonal to the axis of the stanchion, a cam rockingly mounted in the bearing surfaces of the lock comprising on its face opposed to the axis of rotation a longitudinal notch with a slanting bottom the plane of symmetry of which passes through the axis of rotation and the side faces of which are provided with two transversal openings, a clamping shoe inserted into the opening of the foot and adapted to remain engaged with the corresponding face of the sliding stanchion element, an assembling wedge having a small angle permitting an easy driving in and adapted to engage the corresponding parts of the shoe with one of its faces, while its opposed edge is inserted in the outermost part of the notch provided in the cam, a complementary wedge inserted in the rear part of the notch so as to engage the corresponding face of the assembling wedge with one of its faces and the bottom of the notch with its other face and comprising a transversal opening capable of coming to lie opposite the corresponding openings and a key having a section corresponding to that of the opening of the complementary wedge in which it is adapted to be inserted so as to lock the complementary wedge.

6. A metallic mine stanchion which comprises, in combination, a tubular stanchion foot provided in its upper part with an opening opposite one of its faces, an upper stanchion element slidably mounted inside the foot, a lock with the upper part of the foot and determining bearing surfaces with an axis orthogonal to that of the stanchion, a cam rockingly mounted in the bearing surfaces of the lock, comprising, on its face opposed to the axis of rotation, a longitudinal notch the plane of symmetry of which passes through the axis of rotation and the bottom of which makes an angle near 22° with the latter and the side faces of which are provided with two transversal openings, a clamping shoe inserted in the opening of the foot and adapted to remain engaged with the corresponding face of the sliding stanchion element, an assembling wedge having an angle near 12° and adapted to engage the corresponding parts of the shoe, while its opposed edge is inserted in the outermost part of the notch provided in the cam, a complementary wedge adapted to be inserted in the notch with an angle such that both its faces simultaneously engage the corresponding face of the assembling wedge and the bottom of the notch and comprising a transversal opening capable of coming to lie opposite the corresponding openings and a key having a section corresponding to that of the complementary wedge in which it is adapted to be inserted so as to lock the complementary wedge.

7. A mine stanchion comprising in combination a tubular stanchion foot; an upper stanchion member slidably mounted within said tubular stanchion foot; an opening in the upper part of said tubular stanchion foot; a clamping shoe inserted in said opening and abutting with its rear face against said upper stanchion member within said tubular stanchion foot; a lock fastened to said upper part of said tubular stanchion foot and provided with bearing faces arranged spaced from said tubular stanchion foot and having an axis orthogonal to the axis of said tubular stanchion foot; a cam member rockingly mounted with one face in said bearing faces of said lock and having on its opposite face a slanting face portion; and a wedge arrangement engaging with one wedge face said slanting face portion on said cam member and with another wedge face said clamping shoe.

8. A mine stanchion comprising in combination a tubular stanchion foot; an upper stanchion member slidably mounted within said tubular stanchion foot; bearing faces on the outer face of said clamping shoe; a lock fastened to said upper part of said tubular stanchion foot and provided with bearing faces arranged spaced from said tubular stanchion foot and having an axis orthogonal to the axis of said tubular stanchion foot; a cam member rockingly mounted with one face in said bearing faces of said lock and having on its opposite face a slanting face portion; and a wedge arrangement engaging with one wedge face said slanting face portion on said cam member and with another wedge face said bearing faces on said clamping shoe.

EMILE ALFRED PIERRE.

REFERENCES CITED

The following references are of record in the file of this patent:

UNITED STATES PATENTS

| Number | Name | Date |
| --- | --- | --- |
| 2,297,469 | Groetschel | Sept. 29, 1942 |

FOREIGN PATENTS

| Number | Country | Date |
| --- | --- | --- |
| 136,955 | Great Britain | Dec. 31, 1919 |